April 30, 1935.  E. AMMANN  1,999,888
WELDROD
Filed Aug. 4, 1932
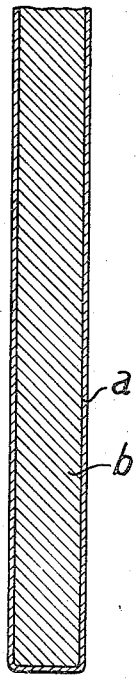
Inventor:
Ernst Ammann
By Knight Bros
His Attys.

Patented Apr. 30, 1935

1,999,888

UNITED STATES PATENT OFFICE 1,999,888

WELDROD

Ernst Ammann, Essen, Germany, assignor to Fried. Krupp Aktiengesellschaft, Essen-on-the-Ruhr, Germany Application August 4, 1932, Serial No. 627,504
In Germany September 19, 1931

8 Claims. (Cl. 219—8)

The invention relates to weldrods. It is known to use in metal-depositing welding operations, where high resistance to wear and high tenacity of the weld is required, iron-tungsten alloys which advantageously contain about 20 to 80% tungsten and 0.5 to 6% carbon. In these welding alloys the iron may be replaced by the remaining metals of the iron group, such as nickel or cobalt, and the tungsten by the remaining carbide-forming heavy metals, such as molybdenum, titanium, uranium, vanadium, boron. Very satisfactory results are obtained in deposition welding by using an alloy containing about 62% Wo, 4.3% C and 32.7% Fe. This alloy has a melting point of about 1800 to 1900° centigrade and, consequently, is well suited to be deposited by welding by means of the oxyacetylene flame which gives a temperature of about 2000 to 2200° centigrade. On the other hand, an alloy of such high melting point cannot be cast into weldrods of the usual length by means of the existing technical appliances.

The invention has for its object to overcome this drawback that is to render possible the manufacture of weldrods of the above average composition and of the customary length. This object is achieved according to the invention by filling an iron tube with a suitable mixture of tungsten carbide and one or more auxiliary metals of lower melting point and sintering the mixture down at a temperature of more than 1000° centigrade, so that a solid core is formed. When a weldrod of this structure is used in welding by means of the oxyacetylene flame, the iron of the tube melts first and is overheated by the flame to such an extent that the tungsten carbide which simultaneously is very highly heated dissolves in the liquefied iron. Furthermore, the sintered core of a weldrod manufactured according to the invention possesses good electric conductivity so that the weldrod is well suited also for electric welding.

A satisfactory fusion of the core with the iron of the tube is attained by adding to the core material previous to the sintering up to 30% chromium or chromium carbide, 5% silicon, and 10% manganese, particularly good results being obtained by addition of about 10% of chromium or chromium carbide, about 2 to 3% silicon, and about 3 to 5% manganese.

A weldrod manufactured according to the invention is illustrated by way of example in the accompanying drawing in a fragmentary sectional view. In this drawing $a$ denotes an iron tube and $b$ the core which consists of a sintered mass of one of the compositions hereinbefore described.

What I claim and desire to secure by Letters Patent is:—

1. The process of manufacturing weldrods consisting in preparing a mixture of at least one carbide of a metal of high melting point and of at least one auxiliary metal of lower melting point, filling a tube made from metal of the iron group with this mixture and sintering the latter within said tube.

2. In the process as specified in claim 1 giving the mixture a composition such as to obtain in welding an iron-tungsten alloy containing about 20 to 80% tungsten, 0.5 to 6% carbon, and the remainder iron.

3. In the process as specified in claim 1 giving the mixture a composition such as to obtain in welding an iron-tungsten alloy containing about 62% tungsten, 4.3% carbon, and the remainder iron.

4. In the process as specified in claim 1 adding to the mixture to be sintered previous to the sintering up to 30% chromium or chromium carbide, 5% silicon, and 10% manganese.

5. In the process as specified in claim 1 adding to the mixture to be sintered previous to the sintering about 10% chromium or chromium carbide, 2 to 3% silicon, and 3 to 5% manganese.

6. As a new article of manufacture a weldrod comprising an envelope of a metal of the iron group containing a mixture sintered within said envelope of at least one carbide of a metal of high melting point with at least one auxiliary metal of lower melting point.

7. As a new article of manufacture a weldrod comprising an iron envelope containing a composition sintered within said envelope which, together with the iron of the envelope, in welding gives an iron-tungsten alloy containing about 20 to 80% tungsten, 0.5 to 6% carbon, and the remainder iron.

8. As a new article of manufacture a weldrod comprising an iron envelope containing a composition sintered within said envelope which, together with the iron of the envelope, in welding gives an iron-tungsten alloy containing about 62% tungsten, 4.3% carbon, and the remainder iron.

ERNST AMMANN.